UNITED STATES PATENT OFFICE.

LUDWIG VANINO, OF MUNICH, GERMANY.

WET PROCESS OF EXTRACTING SILVER FROM ITS HALOID SALTS.

SPECIFICATION forming part of Letters Patent No. 630,951, dated August 15, 1899.

Application filed January 21, 1899. Serial No. 702,973. (No specimens.)

*To all whom it may concern:*

Be it known that I, LUDWIG VANINO, doctor of philosophy, residing at Munich, in the Kingdom of Bavaria, German Empire, have invented certain new and useful Improvements in Wet Processes of Extracting Silver from its Haloid Salts; and I do hereby declare the following to be a full, clear, and exact description of the invention, such as will enable others skilled in the art to which it appertains to make and use the same.

The present invention relates to the extraction of silver from its haloid salts, more particularly from its solid haloid salts by the wet way, and has for its purpose to do away with the technical inconveniences the extraction of silver from its solid haloid salts by the wet way as presently operated is accompanied with.

Many methods have been proposed for reducing solid haloid salts of silver to metallic silver by the wet way. For instance, metallic silver can be obtained by bringing together chlorid of silver and zinc or iron in weakly-acidulated water, or by boiling humidified chlorid of silver together with sugar, honey, dextrine, or other carbohydrates and sodium carbonate, or by digesting chlorid of silver with sugar and potassium hydroxid. Either of those and the other known methods is defective in that the reduction takes place but imperfectly; that this imperfect reduction requires a comparatively long space of time; that, moreover, to obtain this imperfect result the assistance of heat is required, and that the silver is not obtained in a sufficiently pure state, but requires to be purified by special operations. I have discovered that formic aldehyde behaves as a very powerful reducing agent toward insoluble or solid haloid salts of silver also, provided it be caused to act in the presence of a solution of an alkaline agent, such as the hydroxids and carbonates of alkaline and alkaline-earth metals. Under that condition the reducing power of formic aldehyde is such that the conversion, for instance, of solid chlorid of silver into metallic silver takes place in the cold and then requires but a few minutes without leaving any trace of undecomposed chlorid.

My invention consists in the use of this discovery of mine for operating the wet extraction of pure metallic silver from its solid haloid salts.

In carrying out the invention, I mix the haloid salt—for instance, solid chlorid of silver—with a solution of one or more of said alkaline agents, preferably with a solution of sodium hydroxid, and to this mixture I add a watery solution of formic aldehyde, operating in the cold. The reduction begins at once and is quantitatively complete after a few minutes.

A modification consists in passing formic-aldehyde vapors into the mixture of solid chlorid of silver and alkaline lye, the mixture being stirred. The silver deposit is separated from the lye and freed from adhering formic aldehyde and alkaline lye by mere washing with water and then proves to be of an extraordinary degree of purity.

The important industrial advantage of my wet process as compared with the older wet methods consists in that the entire quantity of silver present in the salt treated is obtained in the state of perfectly pure metal and so in the cold and with great saving of time.

What I claim as my invention is—

The wet process of extracting silver from its insoluble haloid salts, which consists in mixing said haloid salts with a watery solution of alkaline agents, and adding formic aldehyde in the cold, substantially as and for the purpose specified.

In testimony whereof I affix my signature in presence of two witnesses.

LUDWIG VANINO.

Witnesses:
 EMIL HENZEL,
 RÜDOLF DIEM.